C. G. IVES.
CAMERA EXPOSURE INDICATOR.
APPLICATION FILED SEPT. 15, 1910.

995,870.

Patented June 20, 1911.

WITNESSES:
H. J. Walker
P. A. Hoster

INVENTOR
Charles G. Ives
BY
ATTORNEYS

UNITED STATES PATENT OFFICE.

CHARLES G. IVES, OF NORWALK, CONNECTICUT.

CAMERA EXPOSURE-INDICATOR.

995,870.

Specification of Letters Patent.  Patented June 20, 1911.

Application filed September 15, 1910. Serial No. 582,197.

*To all whom it may concern:*

Be it known that I, CHARLES G. IVES, a citizen of the United States, and a resident of Norwalk, in the county of Fairfield and State of Connecticut, have invented a new and Improved Camera Exposure-Indicator, of which the following is a full, clear, and exact description.

The invention relates to cameras, and has for an object to provide an attachment to the camera whereby an indicator will denote that a film has been exposed when the shutter is operated.

For the purpose mentioned, use is made of an indicator for automatically indicating an exposure when the shutter lever is operated and a connection between the indicator and the film winding mechanism of the camera whereby the indicator is returned to normal position when the exposed film is wound on the winding mechanism.

Although I am aware that various devices have been conceived for the purpose mentioned, the majority of these attachments become inoperative when time exposures are made with the camera. Furthermore the intricate mechanism involved in the construction of the mentioned devices makes them commercially unpractical.

In my device is embodied a simple construction that accomplishes the desired object and is adaptable for both instantaneous and time exposures.

The indicating means of my device is automatically operative when the film is exposed and is returned to normal position when the exposed film is wound onto the receiving reel in the usual manner.

Reference is to be had to the accompanying drawings, constituting a part of this specification, in which similar characters of reference denote corresponding parts in all the views, and in which—

Figure 1:
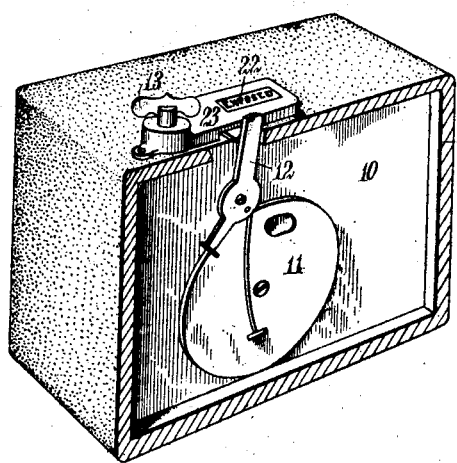
Figure 2:
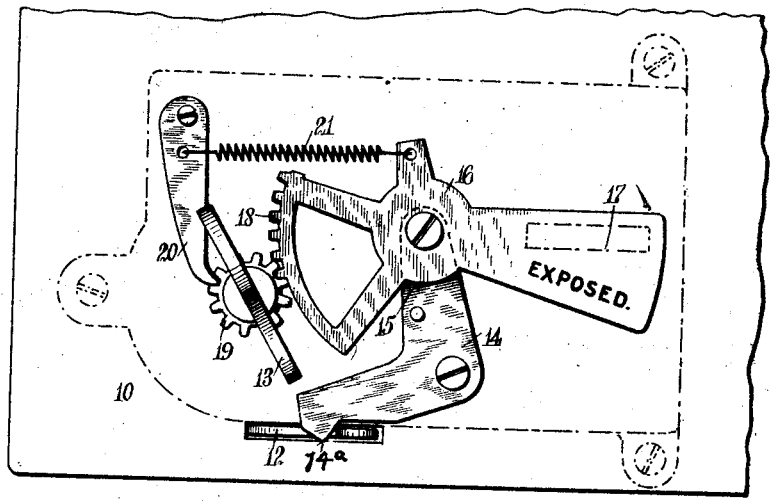

Figure 1 is a perspective view of a camera with the front removed and showing my device attached thereto, and the indicator in final or exposed position; and Fig. 2 is a fragmentary plan view of the upper side of the camera with the cover removed to disclose the underlying structure, the indicator being shown in initial position.

Referring more particularly to the views, I provide a camera 10 having the usual shutter 11, a shutter lever 12 and a film winding mechanism 13 of any preferred construction. Pivotally mounted on the camera 10 and adapted to engage the shutter lever 12 is a lever 14 having an arm 15 on which is pivotally mounted an indicator 16 and with the lower end of the lever 14 provided with a converging contact point $14^a$ adapted to be engaged by the shutter lever 12. On an arm 17 of the indicator a word such as "Exposed" or any similar expression is affixed and the arm 17 is adapted to move into two positions, as will be hereinafter more fully disclosed. The other end of the indicator 16 terminates in a rack 18 in engagement with a pinion 19, secured to the winding mechanism 13. A pawl 20 pivotally mounted on the camera 10 engages the pinion 19 to prevent the indicator 16 from assuming an inoperative position and a spring 21 is secured to the pawl 20 and the indicator 16 as will be easily seen in Fig. 2.

Now, assuming that the various operative parts described, are in the initial position shown in Fig. 2, when a film is exposed by moving the lever 12, thus operating the shutter 11 in the usual manner, the action of the shutter lever 12 moves the lever 14 so that the rack 18 is disengaged from the pinion 19, and as the spring 21 is secured to the indicator, the same will move upwardly and the word "Exposed" will be disclosed through an opening 22 in a cover 23 secured to the top of the camera. As the shutter lever 12 is moved to engage the lever 14, the said shutter lever engages a converging side of the contact point $14^a$ and moves the rack 18 out of engagement with the pinion 19, thus permitting the arm 17 to spring upwardly, due to the action of the spring 21, and expose the word "Exposed." Now as the lever 12 is moved onwardly past the point of convergence of the sides of the contact point $14^a$, the lever will engage the other converging side of the contact point and thus cause the rack 18 to reëngage the pinion 19, as will be easily understood by referring to Fig. 2 in the drawings. In this manner the operator can instantly see whether the film has been exposed or not. Now, assuming that the film has been exposed, as mentioned, to prepare the next film for proper exposure the winding mechanism 13 is operated to wind the exposed film onto a reel of the mechanism, and at the same time dispose a new or unexposed film in a position for exposure. When the mechanism 13 is operated as mentioned, the pinion 19 revolves and consequently the rack 18 in engagement with the pinion moves to return the indicator 16 to the initial position shown in Fig. 2 and the pawl 20 prevents the pinion from turning backward, thus holding the indicator in operative position.

As mentioned heretofore, my device is applicable for use in connection with both instantaneous and time exposures. From the foregoing description it will be readily understood that when an instantaneous exposure is made, the action of the shutter lever will operate the arm 17 to disclose the word "Exposed" and the action of the winding mechanism will return the arm 17 to normal position. Now, when a time exposure is made the first movement of the shutter lever to open the shutter will operate the arm 17 to disclose the word "Exposed" and without regard to the number of times the shutter lever is operated after the first mentioned movement, the word "Exposed" will remain disclosed until the winding mechanism is operated to return the arm 17 to its initial position. Thus it will be seen that when either a time or instantaneous exposure is made, my indicating device will automatically denote that an exposure has been made. When an exposure has been made and the film winding mechanism 13 is operated to move a new film into the focal plane of the camera and return the arm 17 to its initial position, approximately a half turn of the winding mechanism will return the arm 17 to the initial position, but will not bring the new film in the focal plane of the camera. However, to complete the operation of the winding mechanism and bring the new film to the desired position, the operator has only to prolong the winding of the mechanism until the number of the new film is shown in the film indicating space which is provided on most cameras and the complete operation of the winding mechanism for each exposure will then be finished.

From the foregoing description it will be seen that an automatic indicator is provided and although for the purpose of describing the device, I have shown a particular construction, it will be understood that the scope of the invention is defined in the appended claims.

Having thus described my invention, I claim as new and desire to secure by Letters Patent:—

1. A camera exposure indicator comprising a lever for engagement with the shutter lever of a camera and pivotally mounted on the camera, a film winding mechanism, and an indicator for engagement with the film winding mechanism of the camera and pivotally mounted on the said lever to indicate an exposure when the shutter lever is operated.

2. A camera exposure indicator comprising a lever for engagement with the shutter lever of a camera and pivotally mounted on the camera, a film winding mechanism, an indicator pivotally mounted on the said lever to indicate an exposure when the shutter lever is operated, and a rack on the indicator and engaging the film winding mechanism of the camera to return the indicator to normal position when the exposed film is wound on the reel of the film winding mechanism.

3. A camera exposure indicator comprising a lever for engagement with the shutter lever of a camera and pivotally mounted on the camera, a film winding mechanism, a spring controlled indicator for engagement with the film winding mechanism of the camera and pivotally mounted on the said lever to indicate an exposure when the shutter lever is operated, and a pawl engaging the film winding mechanism to hold the indicator in operative position.

4. A camera exposure indicator comprising a lever for engagement with the shutter lever of a camera and pivotally mounted on the camera, a film winding mechanism, a spring controlled indicator pivotally mounted on the said lever to indicate an exposure when the shutter lever is operated, a rack on the indicator and engaging the film winding mechanism of the camera to return the indicator to normal position when the exposed film is wound on the reel of the said mechanism, and a spring controlled pawl mounted to engage the film winding mechanism to hold the indicator in operative position.

5. In a camera a film winding mechanism a shutter controlling lever, and indicating means adapted to indicate that a film is exposed when the shutter lever is operated and adapted to be returned to normal position when the winding mechanism is operated.

6. In a camera a film winding mechanism a shutter controlling lever, an indicator for denoting an exposure, a connection between the indicator and the shutter lever whereby the indicator is operated to denote the exposure and a connection between the indicator and the said winding mechanism whereby the indicator is returned to normal position when the exposed film is wound on the said winding mechanism.

In testimony whereof I have signed my name to this specification in the presence of two subscribing witnesses.

CHAS. G. IVES.

Witnesses:
JESSIE H. L. JELLIFFE,
IRA O. GREGORY.